March 14, 1967  D. D. JOHANNESEN  3,308,909
HOLD-DOWN DEVICE
Filed March 22, 1965
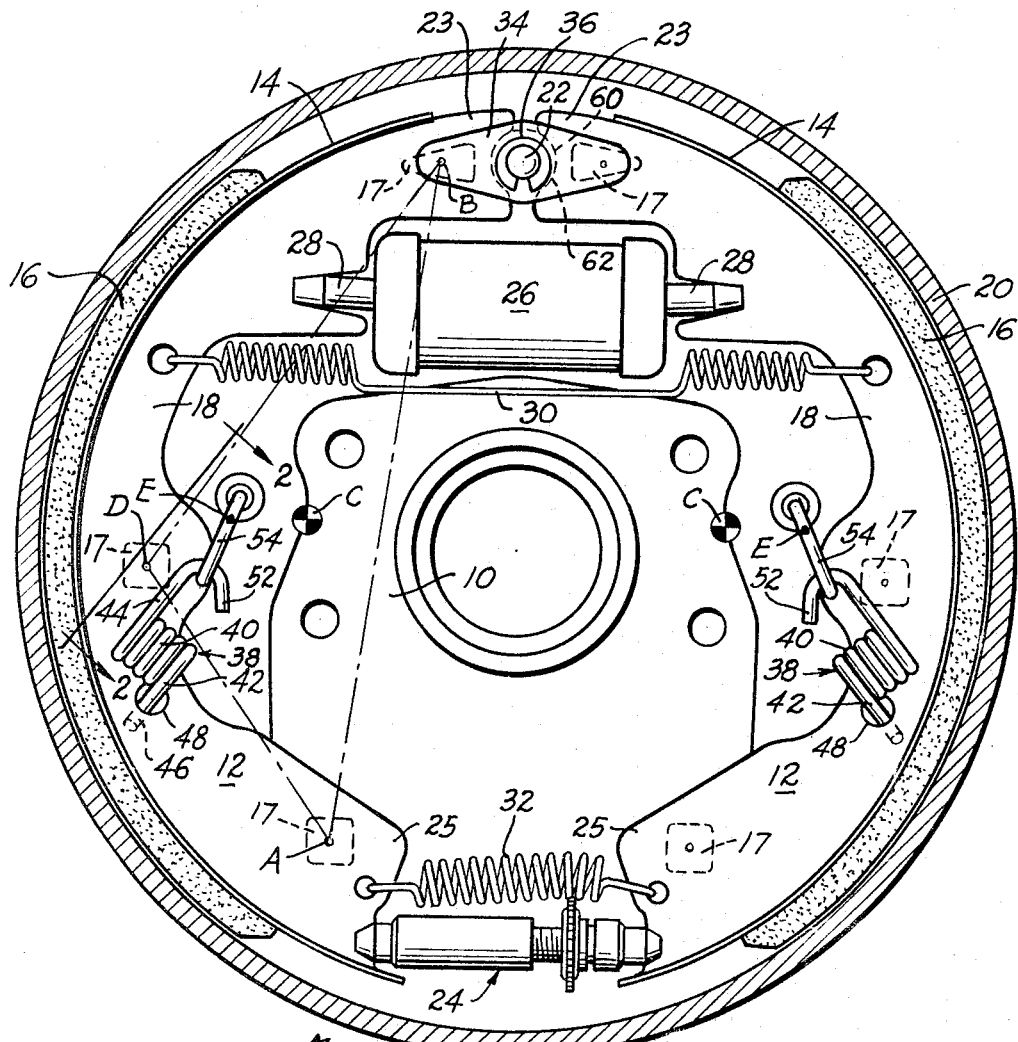
FIG_1
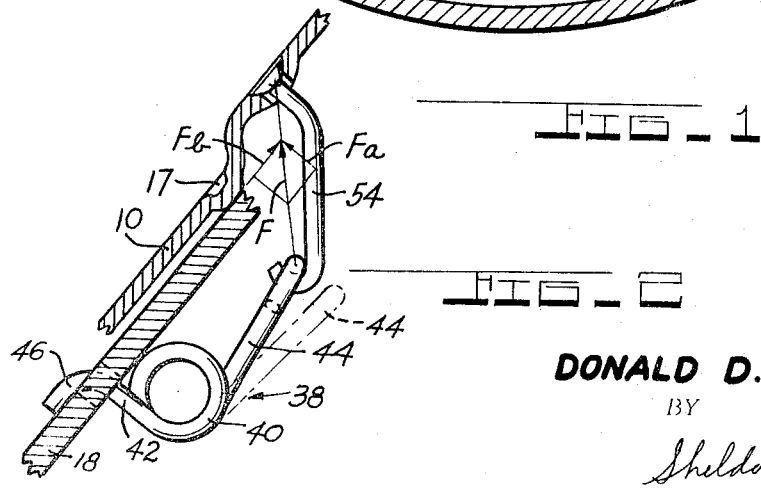
FIG_2
INVENTOR.
DONALD D. JOHANNESEN.
BY
*Sheldon F. Raizes*
ATTORNEY.

United States Patent Office 3,308,909
Patented Mar. 14, 1967

3,308,909
HOLD-DOWN DEVICE
Donald D. Johannesen, South Bend, Ind., assignor to The Bendix Corporation, South Bend, Ind., a corporation of Delaware
Filed Mar. 22, 1965, Ser. No. 441,637
10 Claims. (Cl. 188—78)

This invention relates to a drum brake.

More particularly, this invention relates to a hold-down device for biasing a brake shoe of the brake into engagement with a backing plate of the brake.

An object of this invention is to provide a hold-down device which is an improvement over the hold-down device described and illustrated in my copending U.S. application Ser. No. 249,811, now Patent No. 3,186,519, and in U.S. application Ser. No. 273,745, now Patent No. 3,186,520, filed in the name of Roy E. McCandlish (common assignee).

An overall object of this invention is to provide a hold-down device which is compact, economical to produce, and has sufficient resilient properties to impart a designed hold-down force on a brake shoe while still accommodating manufacturing tolerances thereof and its associated elements.

Other objects of the invention will become apparent from the following description with reference to the drawing, wherein:

FIGURE 1 is a front elevational view of a brake assembly, and

FIGURE 2 is a view taken along section line 2—2.

Referring to the drawing, a backing plate 10 is adapted to be attached to a fixed part of a vehicle, as for instance, an axle flange (not shown). A pair of brake shoes 12 are slidably mounted on the backing plate and each comprises a rim 14 with a brake lining 16 attached thereto and a transverse web 18 attached at its outer edge to the rim. A drum 20 is rotatable about a horizontal axis and is adapted to be engaged by the linings 16 for braking thereof. The shoes are supported on the backing plate by the webs which rest on pads 17. An anchor pin 22 is provided on the backing plate adjacent to one pair of brake shoe ends 23 and an adjusting strut 24 interconnects the other pair of brake shoe ends 25. A fluid motor 26 is fixedly mounted to the backing plate and has a pair of links 28 providing a thrust connection between the fluid motor 26 and the brake shoes on actuation of the brake. A shoe-to-shoe return spring 30, attached to each brake shoe web, retracts the brake shoes into engagement with the anchor pin 22 and a spring 32 interconnects the brake shoe ends 25 and maintains the ends 25 in engagement with the adjuster strut 24. A retainer plate 34 is secured to the anchor pin 22 by a C-clip 36 and serves to limit axial outward movement of the brake shoe ends 23.

Each shoe is provided with a cantilevered hold-down device 38 which includes a coiled body portion 40 located between and integral with an anchoring arm 42 and a loading arm 44, extending in opposite directions. The anchoring arm 42 has a hooked end 46, which extends into an opening 48 of the web and engages the rear surface of the web 18 for anchoring engagement therewith. The arm 44 is axially spaced from the plane of the web and extends in a direction which is inwardly away from the rim 14 and terminates in a hooked end 52. A link 54 is connected at one end to the hooked end 52 of the hold-down device 38 and is pivotally connected at its other end to the support plate 10. The connection between the hooked end 46 of the arm 42 and the web 18 of the brake shoe permits a pivotal movement of the arm 42 and relative sliding movement between the coiled body 40 and the web 18 of the shoe 12.

Referring to FIGURE 2, the arm 44 is shown dotted and in full; the former representing the unstressed condition of the arm 44 prior to connecting the link 54 thereto, and the latter representing the normally stressed position of the arm 44. The arms 42 and 44 are constructed relative to each other that when the link 54 is connected to the backing plate 10, the force exerted on the arm 44 by the link tends to wind the coil body 40 while the arm 42 reacts or anchors on the web of the shoe. The coiled body 40 transfers the force exerted thereon by the link 54 to the brake shoe. The path of the resultant force F is determined by the effective connecting point between the link 54 and the arm 44 and the effective connecting point between the link 54 and the backing plate 10. The resultant force F may be resolved into an axial component $F_a$ and an uplifting component $F_b$. The axial component $F_a$ effects a hold-down force on the shoe which in turn imposes the same axial force on the pads 17. The effective location of the axial component $F_a$ acting on the shoe and pads 17 occurs at the intersection of the path of the resultant force F and the plane of the pads supporting the shoe which is at point E.

The use of a hold-down device which exerts a resultant axial hold-down force on the brake shoe, which passes as near as possible to the center of gravity of the supporting platform therefor, is especially important when a return spring such as spring 30 interconnecting the shoes is used, since the force exerted on the shoes by the return spring is copolanar with the centerline of the web of the shoe with no lifting effect thereon. If the hold-down load was distributed to the pads 17 in such a manner that one pad would take a much heavier load than the other pad, then it would require a very small disturbing force to lift the shoe off the latter pad resulting in uneven lining wear, dragging, etc. Thus, the axial force exerted by the hold-down device 38 on the shoe must be spread as equally as possible to the pads 17. If the resultant axial force exerted on the shoe by the hold-down device intersects the plane of the pads at the center of gravity C of the supporting platform defined by the pads 17, which is also the geometric center C of triangle A-B-D, formed by lines connecting the pads 17, an equal hold-down load will be exerted on each pad 17 by the shoe. Due to the backing plate configuration, it may not be possible to locate the resultant axial force $F_a$ at the exact center of gravity C, but will be offset slightly therefrom as shown in FIGURE 1.

It has been found upon brake application, that when one of the shoe ends intially engages with the anchor pin 22, a "clunk" noise is heard. This is due to the curved bearing portion 60 of the brake shoe end 23 engaging the anchor pin 22 upon initial contact of the end 23 with the pin. The "clunk" noise may be substantially reduced by the initial contact of the brake shoe end 23 with the anchor pin 22 being at the inner end 62 of the brake shoe end 23 sliding on the anchor pin 22 to bring the curved bearing portion 60 into contact with the anchor pin 22. Thus, a lifting force must be exerted on the shoes so that the inner end 62 will initially engage the anchor pin upon each brake application. The vertical component $F_b$ of the force F acting on the shoes through the hold-down device 38 provides this lifting action on the shoes.

Referring to the hold-down device illustrated in the aforementioned U.S. patent applications, the design illustrated therein presented various problems due to the length of the hold-down device. It was determined that a much more compact hold-down device was needed. However, if the hold-down device illustrated in the aforementioned applications was shortened considerably, then the hold-down device would have been much stiffer, resulting in too great a variance in the designed load for the springs due to the manufacturing tolerances of the spring and its associated members. The coiled spring arrangement illustrated herein enables one to impact adequate wire within a short axial length of the coiled body which possesses the resilient properties capable of effecting a designed load with minimum variation while accommodating tolerance variations in the spring and its associated members.

Upon actuation of the fluid motor 26, the brake shoes 12 are spread into engagement with the brake drum 20. The link 54 will pivot about its connection to the backing plate. If there is a limited amount of space between the backing plate 10 and the web of the shoe 18, as for instance when the shoes are supported on the backing plate by the webs or when the shoes are supported on the backing plate by their rims and the width of the rims limits the space between the backing plate and web, a short link 54 must be used and the link may stop pivoting before the lining 16 engages the drum.

Since the anchoring arm 42 of the hold-down device 38 is pivotally connected to the web 18 and the main body portion 40 slidably bears on the web 18, relative movement will occur between the hold-down device and the shoe when the link stops pivoting, thus allowing the lining 16 to engage the brake drum. Obviously, as the linings wear and the shoes retract to a new adjusted position, the hold-down device 38 will assume a different position relative to the web 18 once the link 54 ceases to pivot about its connection to the backing plate. Obviously, if a long enough link were used, it would not be necessary to have relative movement between the hold-down device and the web 18, although such might still be desirable.

The horizontal axial height of the coiled body portion 40 extends no further away from the web 18 of the shoe than the free end of the arm connected to the link in the hold-down device illustrated in the aforementioned applications. Thus, this hold-down device still requires very little space extending axially outward of the web in contrast to a conventional hold-down coil spring. This is especially advantageous if a narrow shoe is used and/or when a steel rib is used in a drum back which projects axially toward the web and beyond the edge of the rim of the shoe.

While the invention has been described in considerable detail, I do not wish to be limited to the particular construction shown and described and it is my intention to cover hereby all equivalent constructions which come within the scope of the following claims.

What I claim is:

1. In a drum brake: a drum rotatable about an axis, a support member, a brake shoe slidably supported by said support member for engagement with said drum and comprising a rim with friction material attached thereto and a web transverse to said rim and attached at its outer edge to said rim, a cantilevered resilient hold-down device comprising a main coiled body portion which comprises at least one coil, said coiled portion engaging the surface of said web which faces away from said support member, the axis of said coiled portion being generally parallel to the plane of said web, said coiled portion extending into an arm at both axial ends thereof each of which are transverse to the axis of said coiled portion, one of said arms being anchored to said shoe and the other of said arms terminating at a location which is horizontally spaced from the plane of said web in a direction away from said support member; means operatively connected to said support member and said other arm for developing a force on said hold-down device and thereby exert a force on said shoe in a direction toward said support member.

2. The structure as recited in claim 1 wherein said means developing force on said hold-down device comprises a rigid member operatively connected at one end to said other arm and operatively connected at its other end to said support member.

3. The structure as recited in claim 2 wherein said arms are arranged relative to each other so that the force exerted on said hold-down device by said rigid member imparts a force on said coiled portion tending to wind the same.

4. The structure as recited in claim 3 wherein said rigid member extends between a portion of the inner edge of said web and the rotatable axis of the drum.

5. The structure as recited in claim 4 wherein said rigid member is inclined upwards in a direction extending from said support member towards said other arm.

6. In a drum brake; a drum rotatable about an axis, a support member having support pads, a brake shoe slidably supported by said support pads for engagement with said drum and comprising a rim with friction material attached thereto and a web transverse to said rim and attached at its outer edge to said rim, a cantilevered resilient hold-down device comprising a main coiled body portion which comprises at least one coil, said coiled portion engaging an outer surface of said web opposite an inner surface resting on said pads, the axis of said coiled portion being generally parallel to the plane of said web, said coiled portion extending into an arm at both axial ends thereof each of which are transverse to the axis of said coiled portion, an opening in said web between at least two of said pads, one of said arms extending through said opening and pivotally anchoring on the inner surface of said web surrounding said opening, the other of said arms terminating at a location within an area of a triangle circumscribing the location of the pads and which is horizontally spaced from the plane of said web in a direction away from said support member; a link operatively connected to said support member within a triangle circumscribed about said pads, said link being also operatively connected to said other arm for developing a force on said hold-down device and thereby exert a force on said shoe in a direction toward said support pads.

7. The structure as recited in claim 6 wherein said one arm extends away from said coiled portion in a direction toward said rim and said other arm extends away from said coiled portion in a direction away from said rim, said arms being arranged relative to each other so that the force exerted on said hold-down device by said link imparts a force on said coiled portion tending to wind the same.

8. The structure as recited in claim 7 wherein said link extends between a portion of the inner edge of said web and the rotatable axis of the drum.

9. The structure as recited in claim 8 wherein said link is inclined upwards in a direction extending from said support member towards said other arm.

10. In a brake, a hold-down means for holding a brake means to a support means comprising:

triangularly arranged support pads;

a coil spring whose coiled body portion is parallel to and rests on one side of the brake means, which spring includes a first arm connected to said brake means, and a second arm vertically spaced from said brake means and terminating in space to be within an area circumscribed by a triangle connecting said support pads; and a link articulately connected to the support means and gripping the second arm to wind the coiled body portion whereupon a force is created in the coiled spring to hold the brake means against the support pads.

References Cited by the Examiner

UNITED STATES PATENTS

| | | |
|---|---|---|
| 1,936,899 | 11/1933 | Bendix. |
| 2,989,150 | 6/1961 | Compton. |
| 3,152,664 | 10/1964 | Swift _____ 188—78 |
| 3,186,520 | 6/1965 | McCandlish _____ 188—78 |

FOREIGN PATENTS 562,988    9/1958    Canada.

MILTON BUCHLER, *Primary Examiner.*

B. S. MOWRY, *Assistant Examiner.*